US006856387B2

(12) United States Patent
Bruel

(10) Patent No.: US 6,856,387 B2
(45) Date of Patent: Feb. 15, 2005

(54) DEVICE FOR DETERMINING THE INTENSITY AND PHASE OF A COHERENT BEAM OF LIGHT IN A CROSS-SECTION OF THE BEAM

(75) Inventor: Laurent Bruel, Saint Paul Trois Chateaux (FR)

(73) Assignee: Commissariat a l'Energie Atomique, Paris (FR)

( * ) Notice: Subject to any disclaimer, the term of this patent is extended or adjusted under 35 U.S.C. 154(b) by 36 days.

(21) Appl. No.: 10/405,103

(22) Filed: Mar. 31, 2003

(65) Prior Publication Data

US 2004/0085529 A1 May 6, 2004

(30) Foreign Application Priority Data

Apr. 11, 2002 (FR) .............................. 02 13746

(51) Int. Cl.⁷ .................................... G01J 1/00
(52) U.S. Cl. ..................................... 356/121
(58) Field of Search ................... 356/121–122, 356/218, 222, 489, 498, 521; 250/201.9

(56) References Cited

U.S. PATENT DOCUMENTS

| 4,157,223 A | * | 6/1979 | Skolnick | .................... | 356/521 |
| 5,120,128 A | * | 6/1992 | Ulich et al. | ................. | 356/121 |
| 6,052,180 A | * | 4/2000 | Neal et al. | .................. | 356/121 |
| 6,339,469 B1 | | 1/2002 | Bruel et al. | ................. | 356/121 |

FOREIGN PATENT DOCUMENTS

| FR | 2 774 761 | 8/1999 | ............. G01J/9/00 |
| JP | 402051046 A | * 2/1990 | |

OTHER PUBLICATIONS

Fienup, J. R., "Phase retrieval algorithms: a comparison", Aug. 1, 1982, Applied Optics, vol. 21, No. 15, pp. 2758–2769.

Gerchbery et al., "Phase Determination from Image and Diffraction Plane Pictures in the Electron Microscope", Jul. 5, 1971, Optik 34, Heft 3, 6 pages.

Taylor, Leonard S., "The Phase Retrieval Problem", Mar. 1981, IEEE Transactions on Antennas and Propagation, vol. AP–29, No. 2, pp. 386–391.

* cited by examiner

*Primary Examiner*—Hoa Q. Pham
(74) *Attorney, Agent, or Firm*—Thelen Reid & Priest LLP

(57) ABSTRACT

A device for determining the intensity and phase of a coherent light beam (F) in a cross-section of the beam comprises a calculator (1), a camera (2), a detector plane (3), an optical sampling element (4), and two mirrors (5, 6). The device measures the intensity Ii (i=1, . . . N) of the beam in N planes (N≧3). The camera (2) is equipped with a single detector plane (3). The optical sampling element (4) and the two mirrors (5, 6) assemble N distinct elementary beams, generated based on the coherent light beam (F), on N distinct zones of the single detector plane (3).

6 Claims, 7 Drawing Sheets

DEVICE FOR DETERMINING THE INTENSITY AND PHASE OF A COHERENT BEAM OF LIGHT IN A CROSS-SECTION OF THE BEAM

CROSS-REFERENCE TO RELATED APPLICATION

This application claims priority based on French Patent Application Serial No. 02 13746, entitled "Device For Determining the Intensity And Phase of a Coherent Beam of Light in a Cross-Section of the Beam" by Laurent Bruel, filed on Apr. 11, 2002.

TECHNICAL FIELD AND PRIOR ART

The invention relates to a device for determining the intensity and phase of a coherent beam of light in cross-section of the beam. The coherent light is, for example, the light generated by a laser.

The known devices for determining the intensity and the phase of a coherent beam of light in a cross-section plane of the beam are divided into three groups:

1) interferometric devices;
2) Hartmann-Schack devices;
3) spatial profile sampling devices.

The interferometric devices use the combination of the wavefront to be measured with a wave having a phase relation therewith.

The Hartmann-Shack type devices use a phase mask (lens matrices, apertures, etc.) for evaluating the slope of the wave surface at each point. Reconstruction then allows calculation of the wave surface.

The problem of obtaining the phase using intensity profiles has been studied in the literature known by the English term "phase retrieval problem". Study of various solutions is proposed in the articles "Phase retrieval algorithms: a comparison", Applied Optics, Vol 21, p. 2758, August 1982 and "The phase retrieval problem," IEEE transactions on Antennas and Propagation AP29, p. 386, March 1981.

In particular, the algorithm proposed by Gerchberg and Saxton in 1971 (review Optics 34, 275 (1971)) is known. These authors use an image plane and a diffraction plane on a distant field at the focus of a lens.

The French patent published under number 2 774 761 discloses a method for processing spatial profiles making it possible to improve the precision of phase retrieval. This method comprises:

measuring the intensity Ii (i=1 ... N) of a beam in N planes (N≧3) having the plane in which one wishes to determine the intensity and phase distribution;

choosing, for the plane i=1, an initial phase matrix $\phi 1$ and calculating a complex amplitude matrix by term-wise multiplication of the phase matrix $e^{i\phi 1}$ by the corresponding amplitude matrix A1;

for each plane j>1:

determining a propagated complex matrix B'j based on the measured amplitude matrix Aj−1 of the plane j−1 and the phase matrix $\phi$ of the plane j−1 extracting, from B'j, of a phase matrix of the plane j;

iterating the method up to convergence, with j=1 when j−1=N.

The device for implementing this method comprises:

means for measuring intensity Ii (i=1, ... N) of the beam in N planes, N≧3;

based on an initial $\phi 1$ phase matrix corresponding to a plane i=1, programmed calculating means for calculating a complex amplitude matrix. B1 by multiplying the phase matrix $e^{i\phi 1}$ by a corresponding A1 amplitude matrix;

for each plane j>1:

calculating a propagated complex matrix B'j based on the measured amplitude matrix Aj−1 of the plane j−1 and the phase matrix p of the plane j−1;

extracting a phase matrix from plane j of matrix B'j;

iterating the aforesaid calculation by making j=1 when j−1=N.

A device as disclosed in French patent No 2 774 761 is represented in FIG. 1, wherein N=3.

The device comprises three mirrors M1, M2, M3 aligned in the direction of the coherent light beam F, three cameras C1, C2, C3 which can be, for example, charge transfer device cameras, more commonly known as CCD (charge coupled device) cameras and a calculator 1. The mirrors are oriented at 45 degrees relative to the axis of the incident beam. Each mirror diverts at a right angle a fraction of the beam impinging on it. Each CCD camera is placed in the path of one fraction of the diverted beam. The wave planes P1, P2, P3 measured by the respective cameras C1, C2, C3 are optically conjugated from respective wave planes P'1, P'2, P'3 of the main beam. The cameras are connected to the calculator 1. For each of the measurement planes Pi, the intensity measurement Ii is provided to the calculator 1.

The prior art device comprises both cameras and measurement planes. This represents a drawback both in terms of space required and in terms of costs. In fact, the multiplication (N≧3) of the mirrors and the cameras results in a system that is not only voluminous but also expensive.

The invention has none of these disadvantages.

SPECIFICATION OF THE INVENTION

In fact, the invention relates to a device for determining the intensity and phase of a coherent light beam in a cross-section of the beam, said device comprising:

means for measuring intensity Ai (i=1, ... N) of the beam in N planes, N≧3;

based on an initial phase matrix $\phi i$ corresponding to a plane i=1, calculating means programmed for:

calculating a complex amplitude matrix B1 by multiplying the phase matrix $e^{i\phi 1}$ by a corresponding intensity matrix A1;

for each plane j>1:

calculating a propagated complex matrix B'j based on the measured amplitude matrix Aj−1 of the plane j−1 and the phase matrix $\phi$ of the plane j−1;

extracting a phase matrix from plane j of matrix B'j;
iterating the aforesaid calculation by making j=1 when j−1=N, the means for measuring intensity Ai (i=1, ... N) of the beam in N planes, N≧3, comprising means for forming N distinct elementary beams based on the coherent light beam. The means for measuring the intensity Ai (i=1, 2, ... , N) comprise a single detector plane and the means for forming N distinct elementary beams comprise means for assembling the N distinct elementary beams over N distinct zones of the single detector plane.

The invention advantageously enables configuring a device occupying minimal space and is inexpensive to manufacture.

BRIEF DESCRIPTION OF THE DRAWINGS

Other features and advantages of the invention will become apparent when reading the preferred embodiment of the invention with reference to the annexed figures, wherein.

The same references designate the same elements in all of the figures.

DETAILED DESCRIPTION OF THE EMBODIMENTS OF THE INVENTION

Figure 1:
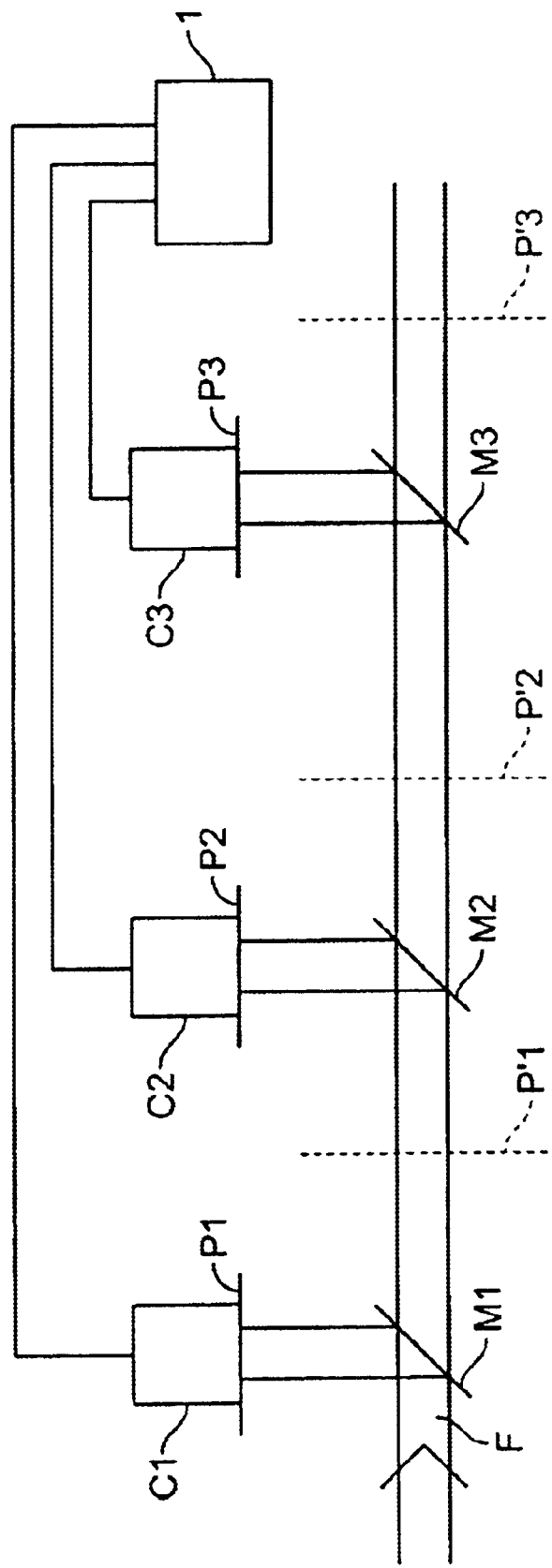
FIG. 1 represents a device for determining the intensity and phase distribution of a coherent light beam in a cross-section of the beam, according to the prior art.

FIG. 1 has been previously described; it serves no useful purpose to revisit it at this point.

Figure 2A:
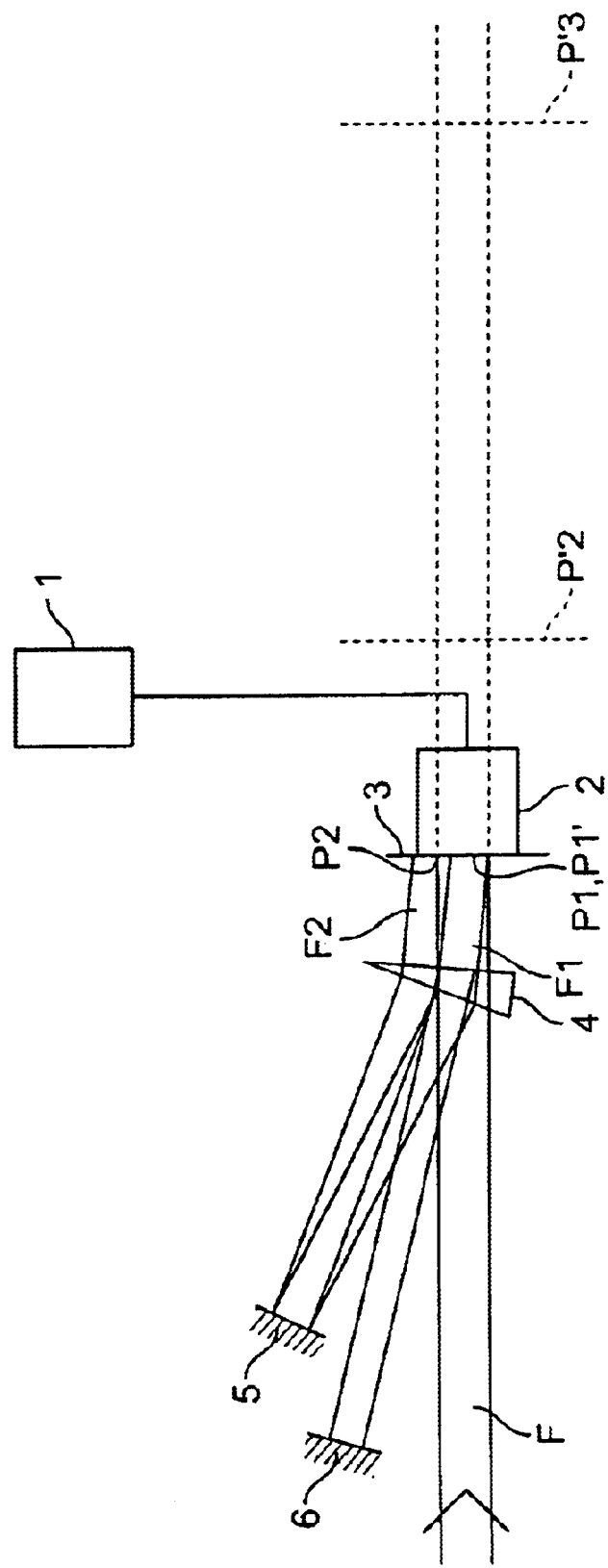
FIGS. 2A and 2B represent, respectively, a top view and a side view of a first example of the device for determining the intensity and phase distribution of a coherent light beam in a cross-section of the beam, according to the invention.
Figure 2B:
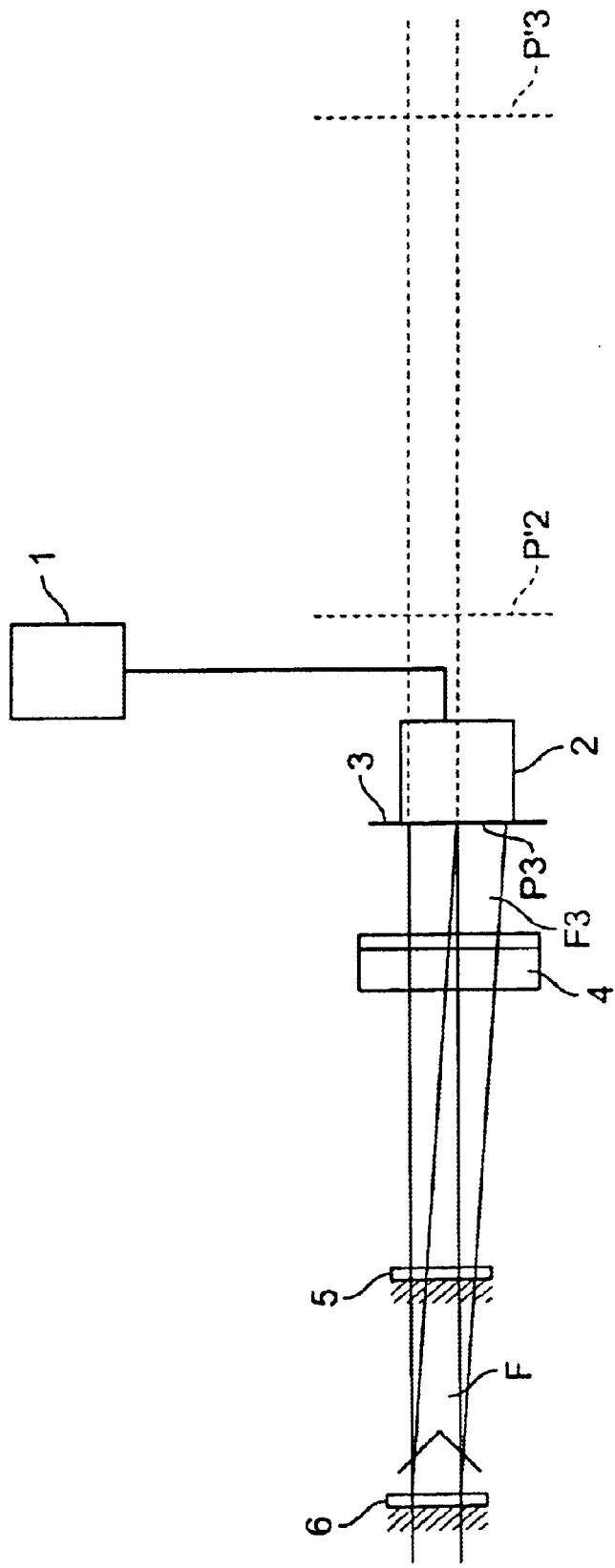

FIGS. 2A and 2B represent, respectively, a top view and a side view of a first example of the device according to the invention for determining the intensity and phase of a coherent light beam in a cross-section of the beam.

The device comprises a camera 2 equipped with a detector plane 3 (detectors of the detector plane are, for example, charge coupling sensors commonly known as CCD sensors), a calculator 1 connected to the camera 2, an optical sampling element 4 and two mirrors 5 and 6.

The optical sampling element 4, a prism, for example, makes possible the formation of three beams F1, F2, F3 based on the coherent light beam F. A first beam F1 is obtained by direct transmission of the beam F through the element 4. The second beam F2 is obtained using the beam F by successively reflecting the beam F on the element 4, reflecting on the first mirror 5 of the beam reflected on the element 4 and transmitting the beam reflected onto the first mirror 5 through the element 4. The third beam F3 is obtained based on the beam F by successively reflecting the beam F on the element 4, reflecting the beam reflected on the element 4 on the second mirror 6 and transmitting, through the element 4, the beam reflected on the second mirror 6.

The detector plane 3 intercepts the beams F1, F2, F3 along the respective measurement planes P1, P2, P3. The measurement P1, P2, P3 are optically conjugated from respective cross-sections P'1, P'2, P'3 relative to the beam F. The plane P'1 is substantially combined with P1. Planes P'2 and P'3 are hypothetical planes of an extrapolated beam constructed by extension of the beam F beyond the camera 2.

Figure 3:
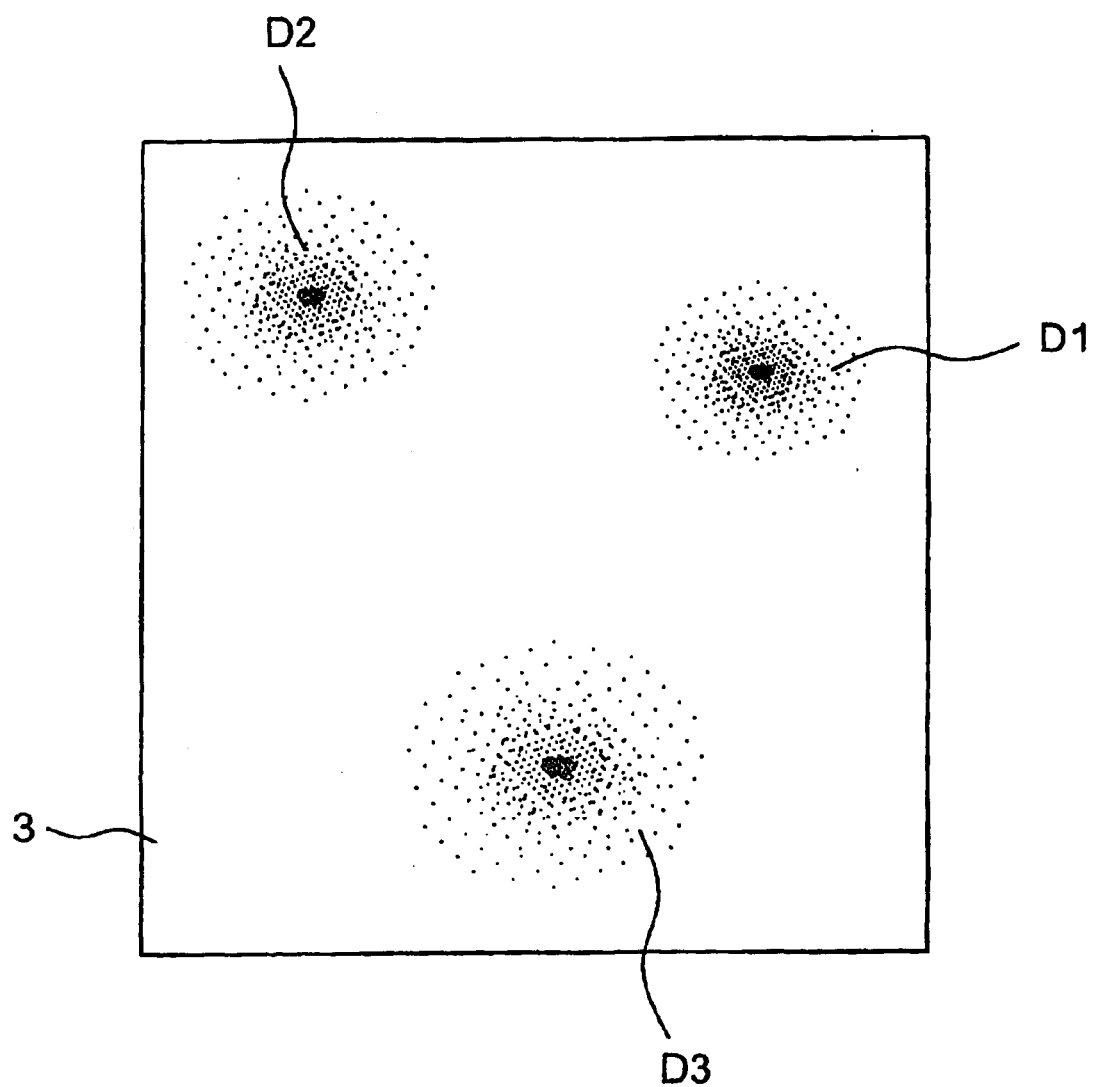
FIG. 3 represents an image generated by a device such as the one represented in FIGS. 2A–2B.

As represented in FIG. 3, the measurement planes P1, P2, P3 result in the formation of the respective detection zones D1, D2, D3 on the detector plane 3. The detection zones are separated from each other. The measurement plane 3 is, for example, comprised of a matrix of 1000 pixels×1500 pixels.

Figure 4C:
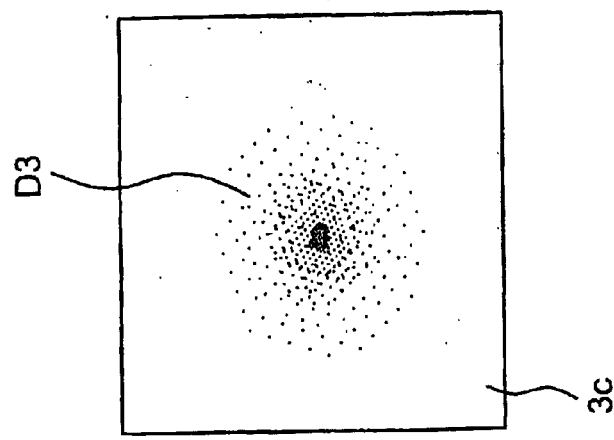
FIGS. 4A–4C represent images derived from the generated image represented in FIG. 3 for the implementation of the method for determining intensity and phase distribution.
Figure 4B:
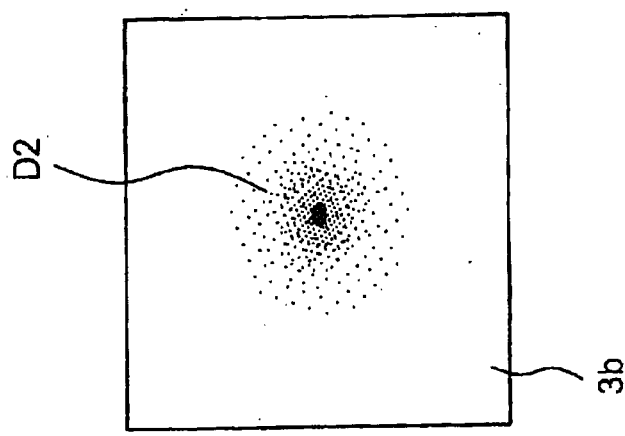
Figure 4A:
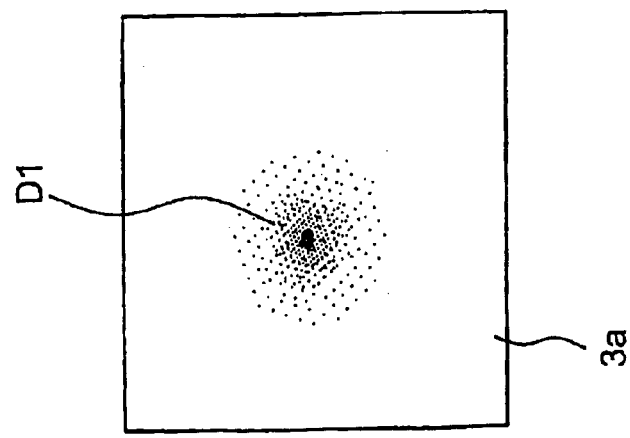

Preferably, based on the overall image obtained on the detector plane 3, the calculator 1 extracts elementary images 3a, 3b, 3c corresponding to the respective detection zones D1, D2, D3 (cf FIGS. 4A, 4B, 4C). The elementary images 3a, 3b, 3c are, for example, made in a 400 pixel×400 pixel space. The complex field (amplitude, phase) of the laser beam in the starting pupil defined by the plane P1 is then calculated using the intensity measurements performed in the planes P1, P2, P3 as is described in French patent No 2 774 761. The complex field (amplitude, phase) in any plane of the beam can then be deduced.

Figure 5A:
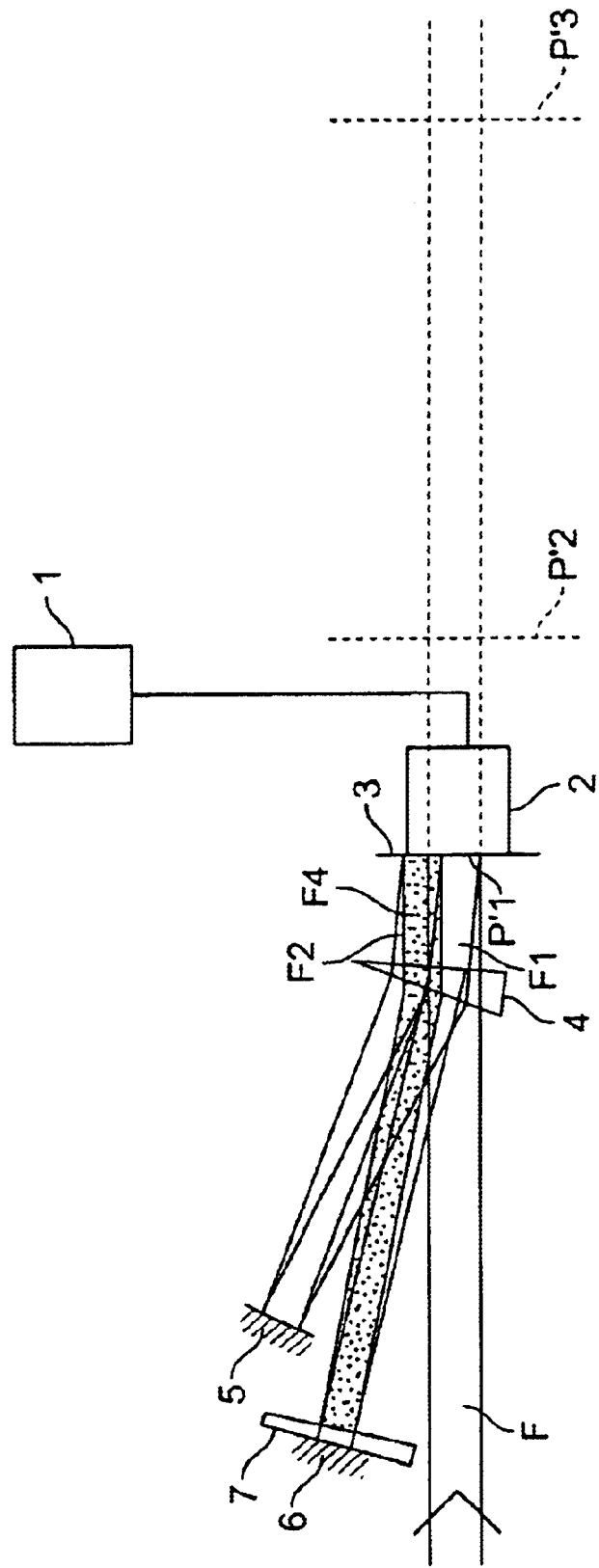
FIGS. 5A and 5B represent, respectively, a top view and a side view of a second example of the device for determining the intensity and phase distribution of a coherent light beam in a cross-section of the beam, according to the invention.
Figure 5B:
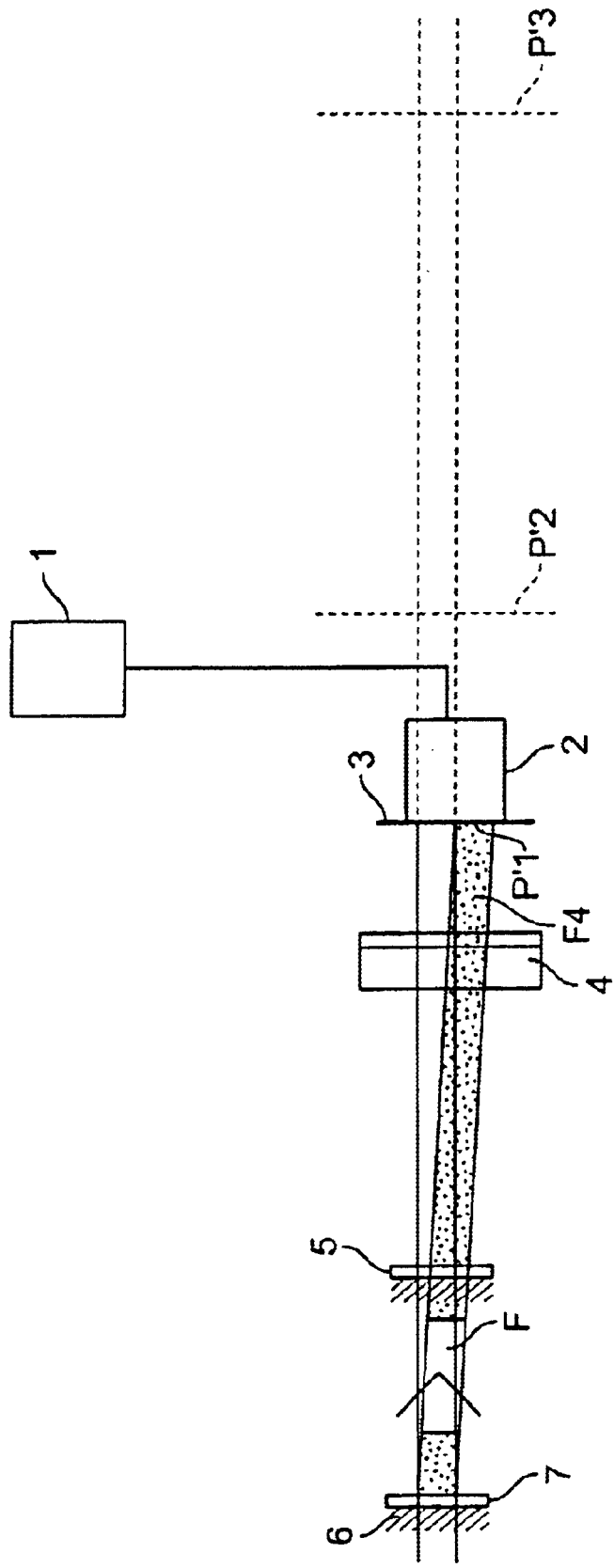

FIGS. 5A and 5B represent, respectively, a top view and a side view of a second example of the device for determining the intensity and phase distribution of a coherent light beam in a cross-section according to the invention.

According to the second example, four diffracted beams F1, F2, F3, F4 are formed from the beam F. In addition to the aforementioned elements in reference to FIGS. 2A and 2B, the device according to the invention comprises in this case a prismatic plate 7 making it possible to duplicate the beam that is reflected onto the mirror 6. A fourth detection zone appears on the detector plane 3.

The two devices described above comprise means for forming, respectively, three and four diffracted beams based on the coherent light beam. Generally, the device according to the invention comprises means for forming N diffracted beams based on the coherent light beam. N images are then formed on the detector plane 3.

According to the prior art, utilization of thick plates results in deviating the measured beams at a right angle relative to the coherent light beam. This results in a sensitive deformation of the measurement planes. Advantageously, according to the invention, utilization of low incidence elements makes it possible to prevent deformation of the measurement planes. It is thus possible to perform better quality measurements.

What is claimed is:

1. A device for determining the intensity and phase of a coherent light beam (F) in a cross-section of the beam, said device comprising:

means for measuring intensity Ai (i=1, . . . N) of the beam in N planes, $N \geq 3$;

based on an initial phase matrix $\phi_1$ corresponding to a plane i=1, calculating means programmed for:

calculating complex amplitude matrix $B_1$ by multiplying the phase matrix $e^{i\phi_1}$ by a corresponding amplitude matrix A1;

for each plane j>1:

calculating a propagated complex matrix $B'_j$ based on the measured amplitude matrix Aj−1 of the plane j−1 and the phase matrix $\phi$ of the plane j−1;

extracting a phase matrix from the plane j of the matrix $B'_j$;

iterating the aforesaid calculation by making j=1 when j−1=N, the means for measuring intensity Ai (i=1, . . . N) of the beam in N planes, $N \geq 3$, comprising means for forming N distinct elementary beams based on the coherent light beam, characterized in that the means for measuring the intensity Ai (i=1, 2, . . . N) comprise a single detector plane and in that the means for forming N distinct elementary beams comprise means for assembling the N distinct elementary beams on N distinct zones of the single detector plane.

2. The device according to claim 1, wherein the calculation means are programmed for extracting N elementary images based on one image formed on the single detector plane.

3. The device according to claim 1, wherein N being equal to three, comprises an optical sampling element, a first mirror and a second mirror, a first beam being obtained by direct transmission of the coherent light beam through the optical sampling element, a second beam being obtained on the basis of the coherent light beam by successively reflecting the coherent light beam onto the optical sampling element and then onto the first mirror and transmitting the beam reflected onto the first mirror through the optical sampling element, and the third beam being obtained on the basis of the coherent light beam by successively reflecting the coherent light beam on the optical sampling element, then onto the second mirror and transmitting the beam reflected on the second mirror through the optical sampling element.

4. The device according to claim 1, wherein the means for assembling the N distinct elementary beams on N distinct zones of the single detector plane comprise at least one optical sampling element.

5. The device according to claim 4, wherein the optical sampling element is a prism.

6. The device according to claim 1, wherein the detector plane comprises charge coupling sensors (CCD).

* * * * *